(No Model.) 2 Sheets—Sheet 1.

M. C. & O. M. McMILLAN.
Corn Harvester.

No. 242,466. Patented June 7, 1881.

Attest,
M. M. Converse
Ora Converse

Inventors.
Moses C. McMillan
Oliver M. McMillan
B. C. Converse atty.

(No Model.) 2 Sheets—Sheet 2.
M. C. & O. M. McMILLAN.
Corn Harvester.
No. 242,466. Patented June 7, 1881.
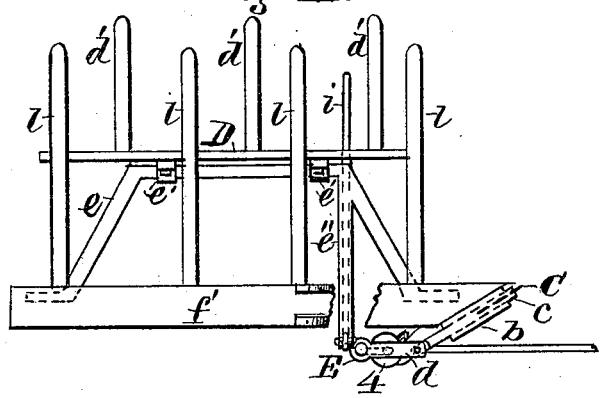
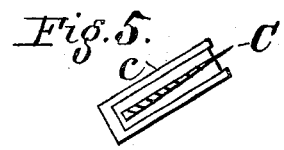
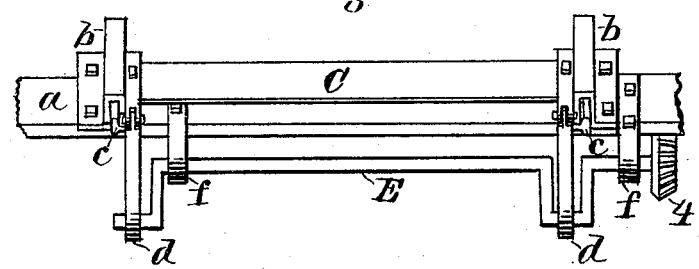
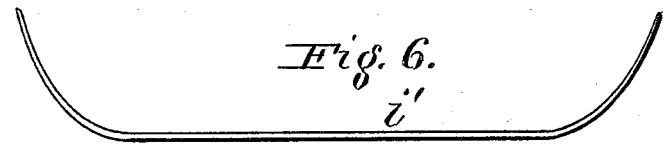
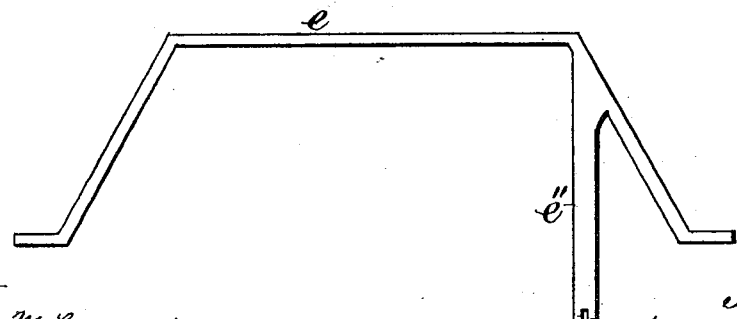
Attest,
M. M. Converse
Ora Converse
Inventors,
Moses C. McMillan
Oliver M. McMillan
B. C. Converse, atty.

UNITED STATES PATENT OFFICE.

MOSES C. McMILLAN AND OLIVER M. McMILLAN, OF CLINTON COUNTY, OHIO.

CORN-HARVESTER.

SPECIFICATION forming part of Letters Patent No. 242,466, dated June 7, 1881.

Application filed January 28, 1881. (No model.)

*To all whom it may concern:*

Be it known that we, MOSES C. McMILLAN and OLIVER M. McMILLAN, both of the county of Clinton, in the State of Ohio, have jointly invented a new and useful Improvement in Corn-Harvesters, of which the following is a specification.

Our invention relates to that class of corn-harvesters in which a knife actuated by machinery is used for cutting the corn, and a movable platform receives it and deposits it, by means of a hand-lever connected therewith, after a sufficient quantity has been cut, in gavels or piles upon the ground.

The object of our invention is to produce a machine, for the purpose of cutting corn standing in the field, which shall be more effective in its operation than those at present patented, and which shall combine in its operative functions a novel cutting device as well as a new dumping-platform.

Heretofore corn-harvesters have been constructed in which circular or disk-shaped knives are used; but knives of this shape are objectionable, as the stalks, if too dry, are not cut entirely off, and clog the knives. In sectional triangular knives, such as are used in wheat harvesters or reapers, a greater amount of power is required to drive the knives or sickle than can be successfully generated by the usual drive-wheels and connecting-gearing; and in order to make a machine of the reaper kind effective it must necessarily be very heavy and ponderous, and is liable to sink its wheels too deeply in the soft ground.

Figure 1:
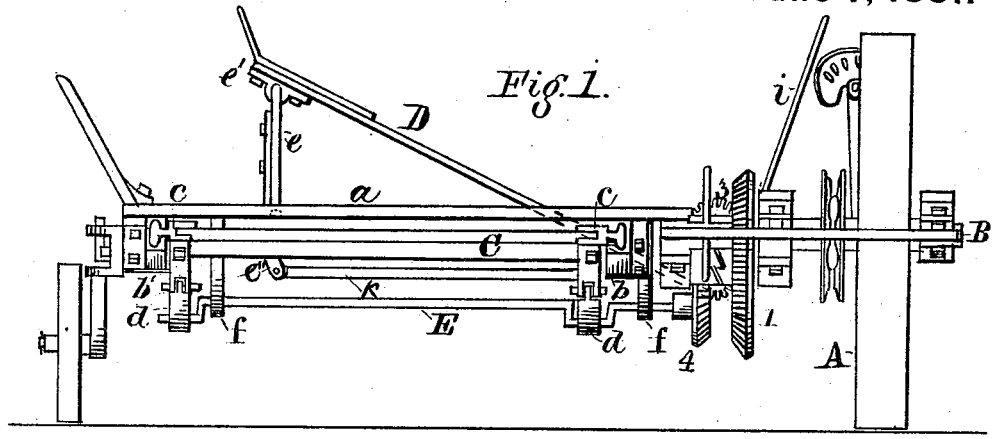
Figure 2:
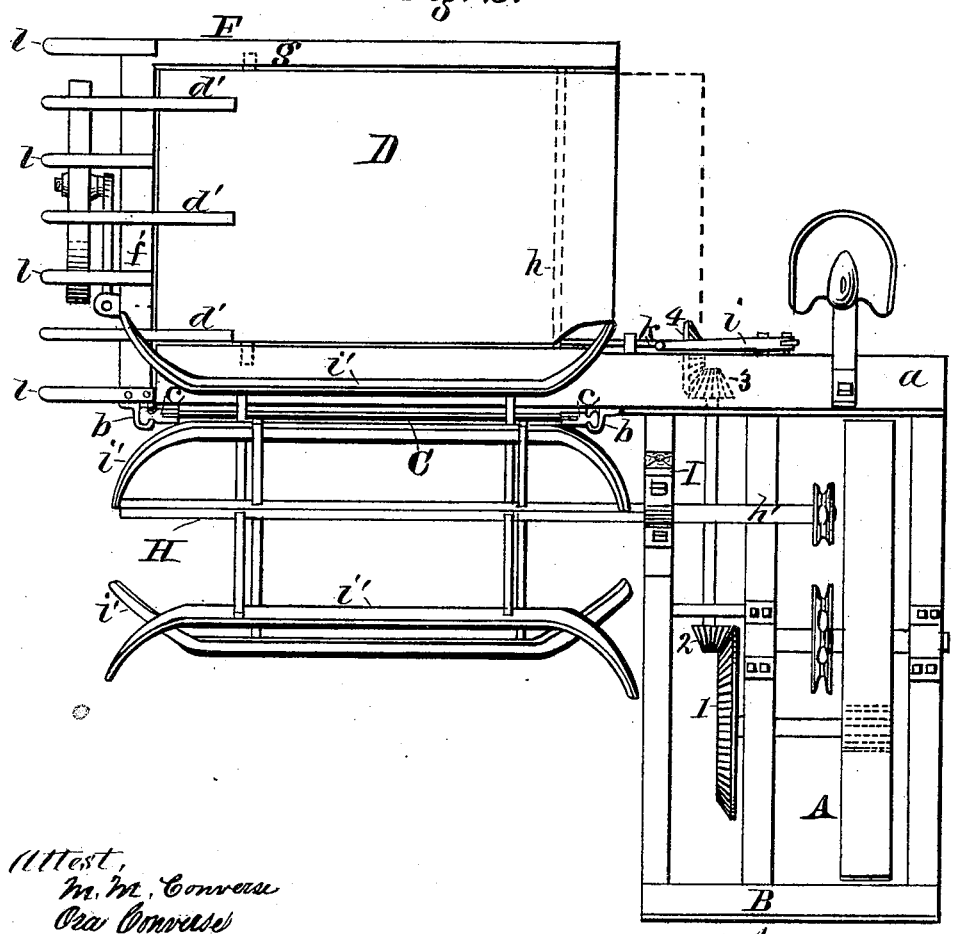

Figure 1 is a front elevation of our improved corn-harvester without the reel. Fig. 2 is a plan view of the same with the reel. Fig. 3 is a detail view showing the knife and its connections from the under side. Fig. 4 is a view from the grain-wheel side, (the left of Fig. 1,) showing the operative parts of the tilting platform. Fig. 5 is a cross-section of knife with attached head. Fig. 6 is an edge view of one of the reel-floats. Fig. 7 is a side view of the arched bar, (seen pivoted under the grain end of the tilting platform, Figs. 1 and 4.)

A is the drive-wheel, which is similar to that of a single-wheeled reaper. It is fitted with internal gear, and is connected with the shaft which drives the knife through two pairs of bevel-wheels, and an intermediate shaft at right angles with the main or drive-wheel shaft.

B is the main frame, which is supported upon the journals of the drive-wheel. It is substantially like that of a reaper in shape, being rectangular. From the rear end extends a long heavy bar, $a$, which supports the guides $b\ b$, in which the sliding bars $c\ c$ at each end of the knife C operate. This bar $a$ also forms the front of the frame which supports the platform D. That part of it which is bolted upon the rear of frame B is flat, and the seat for the driver is bolted to it; but the extension, which forms the front of the platform-frame, (and the cutter-bar proper,) is beveled or inclined upward from rear to front at an angle of about thirty degrees from the horizontal plane. The knife C is set at nearly the same angle, so as to cut at an angle upward when it comes in contact with the stalks of corn. It is driven direct from the crank-shaft E, with which its slides $c\ c$ are connected by the links $d\ d$. Shaft E is supported in the hangers $f f$, which are bolted on the under side (near the rear edge) of the bar $a$. (See Fig. 3, Sheet 2.) The slides $c\ c$ are T-shaped in their cross-section, so as to prevent their displacement when the knife is operated.

F is the frame which supports the platform D and its tilting mechanism. The latter consists of a high arched bar, $e$, the center of which is pivoted in bearings or boxes $e'\ e'$ on the under side of the platform, at the outer end. Its construction is clearly shown in Fig. 4, and also in Fig. 7, the latter of which shows it detached. Its ends, which extend in line with each other, are journaled in the front or cutter bar, $a$, and also in the rear bar or rail, $g$, of the frame F. The inside rail of the platform consists of a rod which extends from the bar $a$ to the inner end of the rear rail, $g$. The platform is entirely disconnected, except with its lifting-bar $e$, and its inner end, when inclined, slides over the rod $h$, which is made round to lessen the friction.

To operate the platform, a hand-lever, $i$, at the rear of frame B, near the driver's seat, is connected with the pivoted arch-bar $e$ by the long lever $k$. (Seen in Figs. 1, 2, and 4.) It will be noticed that the outer end of this lever is flexibly connected with an arm, $e''$, which extends downward from the arched bar e, near its front end.

On the top of the platform D are bars or slats d' d', which extend outward and upward therefrom at the outer or raised end, for the purpose of holding the stalks, (when lying on the platform,) which otherwise might fall off when it is tilted. Their inclination also aids in starting them down toward the inner end when the operation of gaveling is performed.

On the outer rail, f', of frame F are four inclined uprights, l l, which also serve to retain the stalks upon the platform until the latter is dumped. The inclined bars d' d' upon the end of the platform alternate in position between the inclined standards l l, and are in line with them when the platform is horizontal or in its receiving position.

A reel, H, is mounted upon a horizontal shaft, h', upon the top of the post I, which stands on the inside rail of frame B, just behind the line of the main shaft. This reel is operated by a belt or chain extending from a pulley on the inner end of its shaft, over a pulley on the main driving-shaft.

The beaters i' on the reel are of peculiar construction, being made with long curved ends, which project forward from the top beater as the reel is rotated, and tend to gather the corn-stalks in the two rows (which the harvester is intended to cut) toward the reel center, so as to give the knife a better advantage in cutting.

A caster-wheel supports the outer end of the platform-frame F.

The machine may be thrown in and out of gear by a clutch and lever in the usual way.

In operating our corn-harvester the team is driven so as to present two rows of corn to the knife, to which motion is given from the driving-gear through the bevel-wheels 1 2 3 4, the latter being upon the inner end of the crank-shaft E. As this is rotated its two cranks intermediate between its hangers f f drive the slides c c, which form the supports and heads of knife C, through the flexibly-connected links d d. The knife C makes its cut upward at a considerable angle, and as its motions are short and rapid the stalks are cut very easily. The knife is broad and flat and ground to a fine edge, and the front edge of the bar a is beveled, to allow the knife to operate close to its edge. As the machine advances the cut corn is dropped upon the platform D until a sufficient quantity is cut to gavel, when the operator pulls the hand-lever i toward him and tilts the platform, depositing the corn in bunches or gavels ready for shocking.

We claim as our invention—

1. In a corn or other harvester, the combination of a knife provided with a straight cutting-edge, upwardly inclined from rear to front, and reciprocating in the line of inclination, the grooved guides and operating means, substantially as described.

2. The tilting platform D, inclined bars or slats d', and pivoted arch-bar e, in combination with frame F, rod k, and lever i, as and for the purpose hereinbefore set forth.

3. In a corn-harvester, the combination of the following elements: an inclined knife having a stroke upward and forward, held in its position by slides secured to its ends, operating in grooved guides beneath a bar, substantially as and for the purpose hereinbefore set forth.

4. In a frame for a corn-harvester, the combination, with the outer rail of the frame provided with the inclined standards, adapted to catch and hold the stalks, of the inclined slats or bars arranged upon the outer end of the dumping-platform, substantially as shown.

MOSES C. McMILLAN.
OLIVER M. McMILLAN.

Attest:
LEVI MILLS,
WALTON C. FURNAS.